United States Patent [19]

Coin et al.

[11] Patent Number: 4,994,332
[45] Date of Patent: Feb. 19, 1991

[54] METAL HYDROXIDE CRYSTALLIZER AND FILTER

[75] Inventors: Richard J. Coin, Mentor; Carl W. Brown, Jr., Painesville; Jay M. Noscal, Jefferson, all of Ohio

[73] Assignee: Eltech Systems Corporation, Boca Raton, Fla.

[21] Appl. No.: 378,554

[22] Filed: Jul. 11, 1989

[51] Int. Cl.⁵ .................................. H01M 8/04
[52] U.S. Cl. ........................ 429/27; 210/712; 210/714; 210/737; 210/791; 210/149; 210/167; 210/181; 210/196; 210/202; 210/307; 210/312; 210/407; 210/411; 210/415; 210/424; 423/641; 429/14
[58] Field of Search ............... 210/149, 167, 181, 196, 210/202, 251, 295, 407, 408, 411, 413-415, 424, 702, 712, 714, 737, 791, 798, 307, 312; 423/641; 429/27, 14

[56] References Cited

U.S. PATENT DOCUMENTS

| | | | |
|---|---|---|---|
| 2,068,395 | 1/1937 | Burckhalter et al. | 210/181 |
| 3,033,783 | 5/1962 | Lubben | 210/510.11 |
| 3,359,136 | 12/1967 | Merten et al. | 429/80 |
| 3,365,065 | 1/1968 | Varjabedian | 210/332 |
| 3,399,777 | 9/1968 | Passalaqua | 210/332 |
| 4,085,050 | 4/1978 | Gervasi | 210/332 |
| 4,136,026 | 1/1979 | Meyer et al. | 156/642 |
| 4,243,533 | 1/1981 | Savolainen et al. | 210/411 |
| 4,306,966 | 12/1981 | Lucia | 210/149 |
| 4,719,156 | 1/1988 | Niksa et al. | 429/14 |
| 4,724,078 | 2/1988 | Auriol et al. | 210/510.1 |
| 4,735,872 | 4/1988 | Maimoni | 429/27 |
| 4,788,111 | 11/1988 | Niksa et al. | 429/27 |

FOREIGN PATENT DOCUMENTS

| | | |
|---|---|---|
| 0114969 | 7/1986 | European Pat. Off. . |
| 1325843 | 3/1984 | Fed. Rep. of Germany . |
| 2103952 | 3/1983 | United Kingdom ........ 210/295 |

Primary Examiner—Peter Hruskoci
Attorney, Agent, or Firm—John J. Freer

[57] ABSTRACT

The present invention comprises a closed-loop filter system for continuously removing a metal hydroxide precipitate from an alkali metal hydroxide solution. The filter system comprises a filter having a filter surface and a plurality of small diameter openings in said surface. The alkali metal hydroxide solution is impacted onto said filter surface, metal hydroxide precipitate agglomerating on said surface. The filter surface openings have an average diameter effective for said agglomerating. Means are provided to remove the agglomerated precipitate from said filter surface, and to separate the agglomerated precipitate from the alkali metal hydroxide solution, the agglomerated precipitate having a particle weight to surface area ratio effective for said separation.

30 Claims, 2 Drawing Sheets

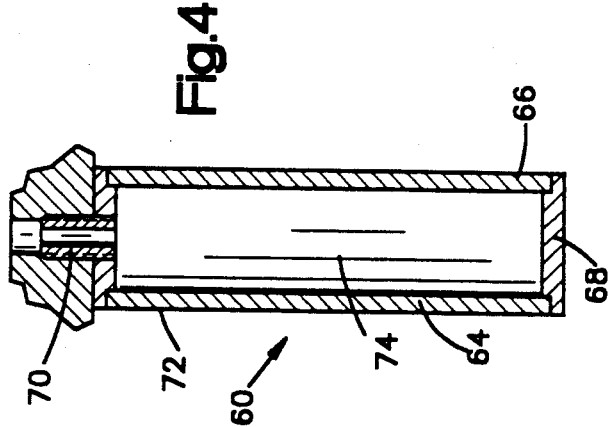
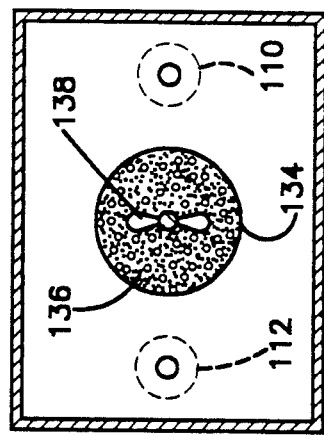
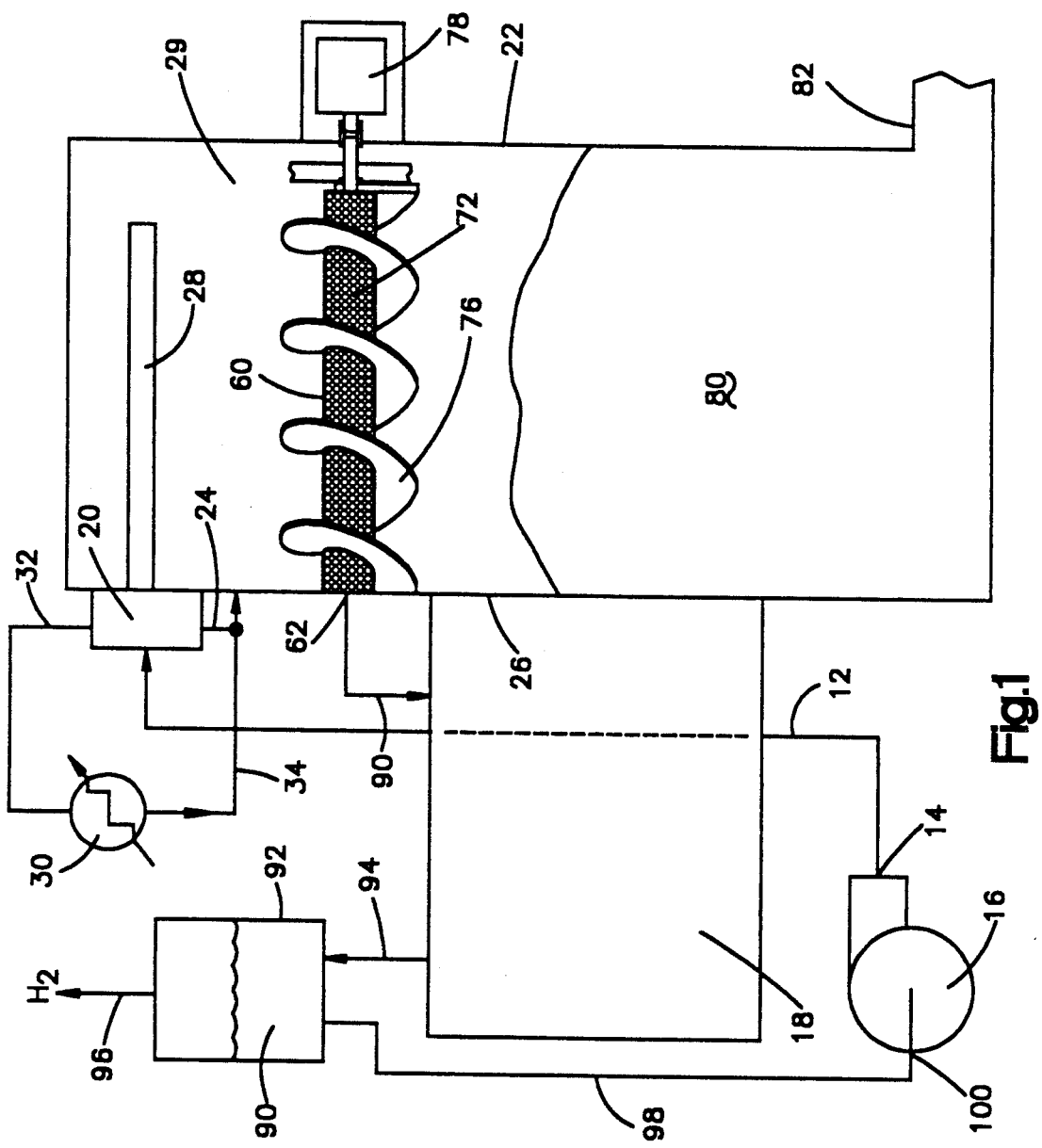

METAL HYDROXIDE CRYSTALLIZER AND FILTER

BACKGROUND OF THE INVENTION

1. Technical Field

The present invention relates to a filter apparatus for removing a metal hydroxide precipitate from an alkali metal hydroxide solution. The present invention will be particularly described with reference to the removal of a metal hydroxide precipitate from an alkali metal hydroxide electrolyte circulated through a metal-air battery, although it will be apparent to those skilled in the art that the present invention has other applications, for instance, the removal of a metal hydroxide from a metal etching solution or a metal surface cleaning solution. The present invention is particularly applicable to the removal of an aluminum hydroxide precipitate from a potassium hydroxide electrolyte circulated through an aluminum-air battery.

2. Description of the Prior Art

Published German Application No. 1,325/84-3 discloses a process for surface cleaning aluminum using a dilute alkaline bath. The bath can contain either sodium hydroxide or potassium hydroxide. Dissolved aluminum hydroxide solids accumulate in the bath. To limit the solids content to 10-30 grams per liter, the applicant proposed separating the solids from the bath by filtration and/or decantation. It is indicated in the published application that the precipitation of solids can be facilitated by adding alkaline salts such as sodium carbonate to the bath, and that the state of aggregation of the precipitate is influenced by the presence of complexing agents such as sodium gluconate. In the example in the application, it is indicated that the filtration can be periodic or continuous, but no details concerning the filtration are given. In the example, a sodium hydroxide solution was the alkaline surface cleaning bath.

European Patent Application Publication No. 0114969 discloses a process and reactor for precipitating an aluminate from an alkaline solution by adding an alkali earth metal hydroxide such as calcium hydroxide to the solution. The alkali earth metal hydroxide precipitate is said to be especially useful to reduce the aluminum content of an alkaline electrolyte solution for batteries having aluminum anodes. A preferred electrolyte solution is indicated to be potassium hydroxide. The reactor contains a filter such as glasswool to filter precipitate from the alkaline solution. However, no provision is made for cleaning the glasswool filter.

Prior U.S. Pat. No. 4,136,026 discloses a system for controlling the dissolved aluminum content of a caustic solution for etching aluminum. A portion of the etch solution is introduced into an open-topped reactor and is treated with aluminum hydroxide. The treatment causes the dissolved aluminum to precipitate from the etch solution in a mean residence time of less than about five (5) hours. A portion of the solution is filtered to remove aluminum hydroxide solids using a vacuum drum filter. Precipitate collected on the outside of the drum filter is scraped off of the drum filter and is collected in a separate container. The solution is a sodium hydroxide solution. The system can be characterized as one that is open, i.e., not closed, in that a number of the containers or vessels in the system are open-topped or exposed to atmosphere. This would be unsuitable with many applications including use with an aluminum-air battery.

Prior U.S. Pat. No. 4,719,156, assigned to assignee of the present application, discloses a system for separating a solid particulate discharge from an aluminum-air battery electrolyte effluent on a continuous basis. The effluent is passed to a solids separator which has an impeller operated at a speed sufficient to concentrate solid particulate in an annulus zone in the separator. The concentrated solids are removed from the annulus zone and allowed to settle in a dewatering vessel from which a clean stream is removed. An example in the patent discloses the use of a potassium hydroxide electrolyte. It is indicated in the example that about 86.4% by weight of the heavy particles (greater than ten microns) and 13.6% by weight of the lighter particles (less than ten microns) were concentrated in the separator so as to be separable from the electrolyte. The balance of the mass of particles remained fluidized throughout the electrolyte, but it is indicated in the example that the fluidization of the particles in the electrolyte was sufficiently suppressed for recirculation of the electrolyte back to the aluminum-air battery. One object of the present invention is to achieve a greater percentage separation of small aluminum hydroxide particles than is possible with the system of U.S. Pat. No. 4,719,156. In this respect, the impeller type separator of U.S. Pat. No. 4,719,156 was found to have optimum usefulness in systems where the electrolyte is a sodium hydroxide solution rather than a potassium hydroxide solution, and where the precipitated aluminum hydroxide particles, for reasons not understood, have a larger average particle size.

A disclosure similar to that of U.S. Pat. No. 4,719,156 is contained in U.S. Pat. No. 4,788,111, also assigned to assignee of the present appliction.

SUMMARY OF THE INVENTION

The present invention comprises a closed-loop crystallization and filter system for continuously removing a metal hydroxide from an alkali metal hydroxide solution. The system comprises a crystallizer tank and a filter at the outlet of said tank, said filter having a filter surface and a plurality of small diameter openings in said surface. Means are provided to impact said alkali metal hydroxide solution onto said filter surface, metal hydroxide precipitate agglomerating on said surface, said filter surface openings having an average diameter effective for said agglomerating. Means are provided to remove said agglomerated precipitate from said filter surface, and to separate said agglomerated precipitate from said alkali metal hydroxide solution in said tank, the agglomerated precipitate having a particle weight to surface area ratio effective for said separation.

The present invention is particularly applicable to the removal of an aluminum hydroxide precipitate from a potasssium hydroxide electrolyte by agglomerating said precipitate onto the surface of a cartridge filter, removing said agglomerated particles from the surface of said cartridge filter, and allowing said agglomerated particles to settle in said electrolyte. The average particle size of the aluminum hydroxide particles which precipitate from a potassium hydroxide electrolyte is in the range of about 0.5 to about 20 microns. Such particles settle in the electrolyte too slowly for efficient separation by settling. By first agglomerating the particles using a cartridge filter, the rate of settling is increased to the extent that separation by settling can be used.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic flow diagram illustrating a preferred embodiment of the present invention;

FIG. 4 is an enlarged section view of a filter cartridge useful in the embodiment of either FIG. 1 or FIG. 2.; and FIG. 5 is a plan view of the filter/crystallizer tank of the embodiment of FIG. 2 taken along line 5—5 of FIG. 2.

DESCRIPTION OF PREFERRED EMBODIMENTS

Figure 2:
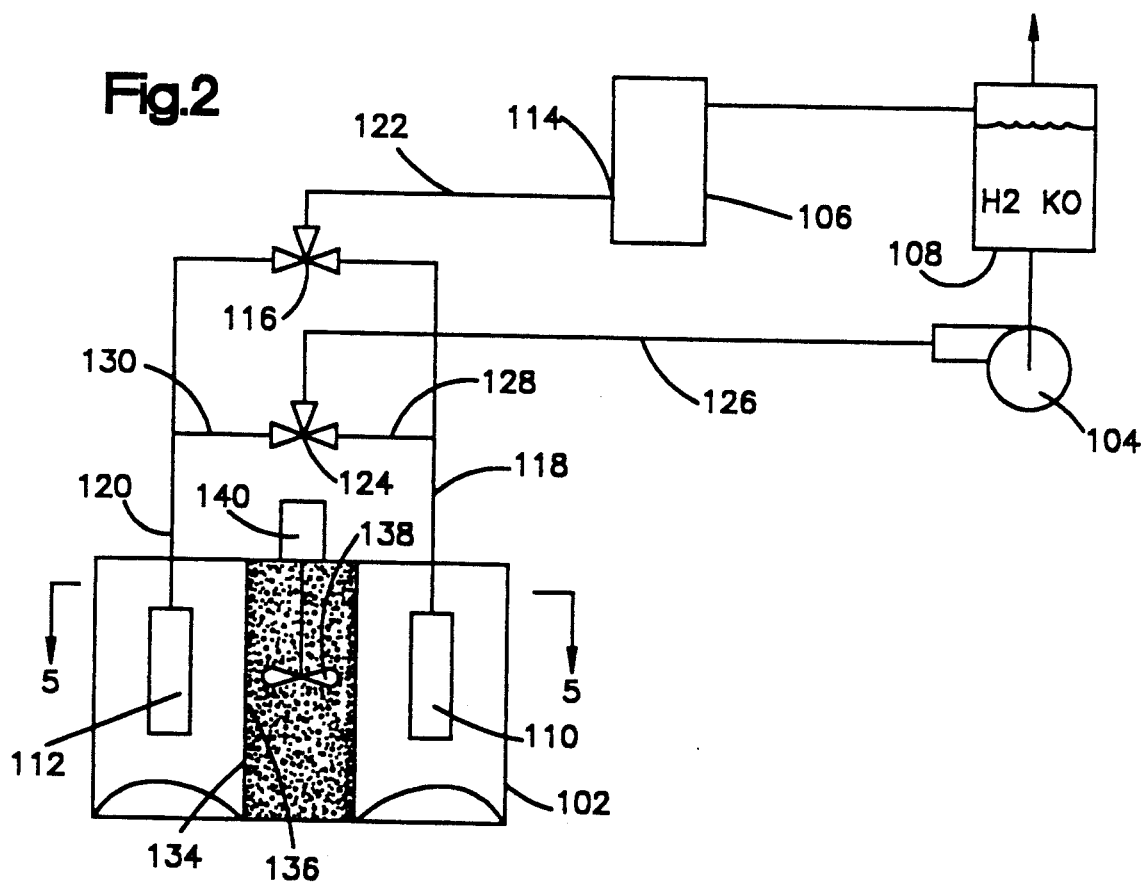
FIG. 2 is a schematic flow diagram illustrating an alternative embodiment of the present invention.

The present invention is broadly applicable to removing a metal hydroxide precipitate from an alkali metal hydroxide solution. Examples of alkali metal hydroxide solutions are aqueous solutions of potassium hydroxide, sodium hydroxide, and mixtures thereof. The present invention is particularly useful for removing a metal hydroxide precipitate from an electrolyte which is circulated through a metal-air battery. Examples of metals used as anodes in metal-air batteries, wherein the present invention is useful, are aluminum, zinc, and lithium. For purposes of the present application, the term "air" means any reducible oxygen containing compound and includes such compounds as air, oxygen, or a peroxide.

The present invention is particularly useful in an electrolyte circulation system for an aluminum-air battery. An example of one useful aluminum-air battery that may be employed with the electrolyte circulation system of the present invention is disclosed in co-pending U.S. application Ser. No. 373,362, filed Jun. 29, 1989 (docket E00246), assigned to assignee of present application. The disclosure of Ser. No. 373,362 is incorporated by reference herein. Details of the aluminum-air battery are not a part of the present invention and will not be described in detail. Broadly, the preferred battery comprises a plurality of cells which can be electrically connected together either in series or in parallel. The cells comprises replaceable aluminum anodes and are essentially closed to atmosphere. A closed-loop electrolyte system is provided for circulating a hydroxide electrolyte through the cells. Although the present invention is generally useful for metal-air batteries, for purposes of convenience reference will usually be made hereinafter to an aluminum-air battery.

In the operation of the aluminum-air battery, aluminum is dissolved in the electrolyte which is circulated through the battery. The reaction, using a potassium hydroxide electrolyte, is:

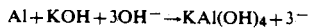

If the aluminate is allowed to build up in the electrolyte, the $OH^-$ concentration is reduced. This in turn causes a reduction in the conductivity of the electrolyte and in the battery performance. In order to regenerate the electrolyte, the aluminate is crystallized per the following reaction:

The fine crystals form a precipitate which is generally known as a hydrargillite which has to be removed from the electrolyte to prevent reduction of electrolyte conductivity, plugging of flow channels and possible erosion of battery components. When a potassium hydroxide electrolyte is used, for reasons not fully understood, the specific hydrargillite precipitate is in the form of very small particles having an average partile size of about 0.5–20 microns. In addition, the particles have a needle-like configuration. Such particles may settle in a non-agitated solution at a rate of about 20 millimeters per hour. This is very slow and would require use of an inordinately large settling tank having a large residence time.

A substantial amount of effort in the past has been directed towards crystallization techniques for causing hydrargillite crystals to grow in size, for instance to an average particle size of about 30 to 35 microns, so that they can be more easily separated from the electrolyte. However, most of the success experienced with agglomeration by crystallization has been with systems where the electrolyte is a sodium hydroxide solution. Also, the growth of the crystals to such large size has been found to be detrimental to the kinetics of the crystallization.

As a general rule, if the separators are made large enough, and the components expensive enough, or if the system is provided with sufficient power, as for example with centrifugal separation, some separation can be achieved. However, aluminum-air batteries typically find application as relatively small power sources, for instance emergency power sources, and being small in size, there is a need for a compact separation system, particularly one which consumes only a small amount of the power generated by the battery.

Referring to FIG. 1, the potassium hydroxide electrolyte is circulated in line 12 from the outlet 14 of pump 16. The electrolyte contains a high concentration of dissolved aluminate from cells 18. The pump 16 need not be a high capacity pump. The circulation rate of electrolyte is a function of the size of the battery. For an aluminum-air battery, such as disclosed in co-pending application Ser. No. 373,362, comprising by way of example a ten cell 400 watt stack, the size of each cell being about 200 square centimeters, the rate of circulation is about one liter per minute or about 0.26 gallons per minute. The electrolyte containing dissolved aluminate is passed in line 12 by means of pump 16 to a diverter valve 20. The diverter valve 20 in its normal position directs the flow into a crystallizer/filter tank 22 via line 24. The tank 22 is a compact closed vessel that may be mounted directly on a side 26 of the cells 18. A thermostat 28 is positioned within the electrolyte 29 in tank 22. The thermostat 28 controls the position of the diverter valve 20. If the temperature of the electrolyte 29 in tank 22 exceeds a predetermined value, the thermostat 28 shifts the diverter valve 20 so that a portion or all of the electrolyte from cells 18 flows through cooler 30 via line 32. The flow from cooler 30 is fed to the tank 22 in line 34 lowering the temperature of the electrolyte 29 in tank 22. A desired temperature range for the electrolyte 29 in tank 22 is about 50°–80° F. By way of example, a setting for thermostat 28 may be about 70° F.

Figure 3:
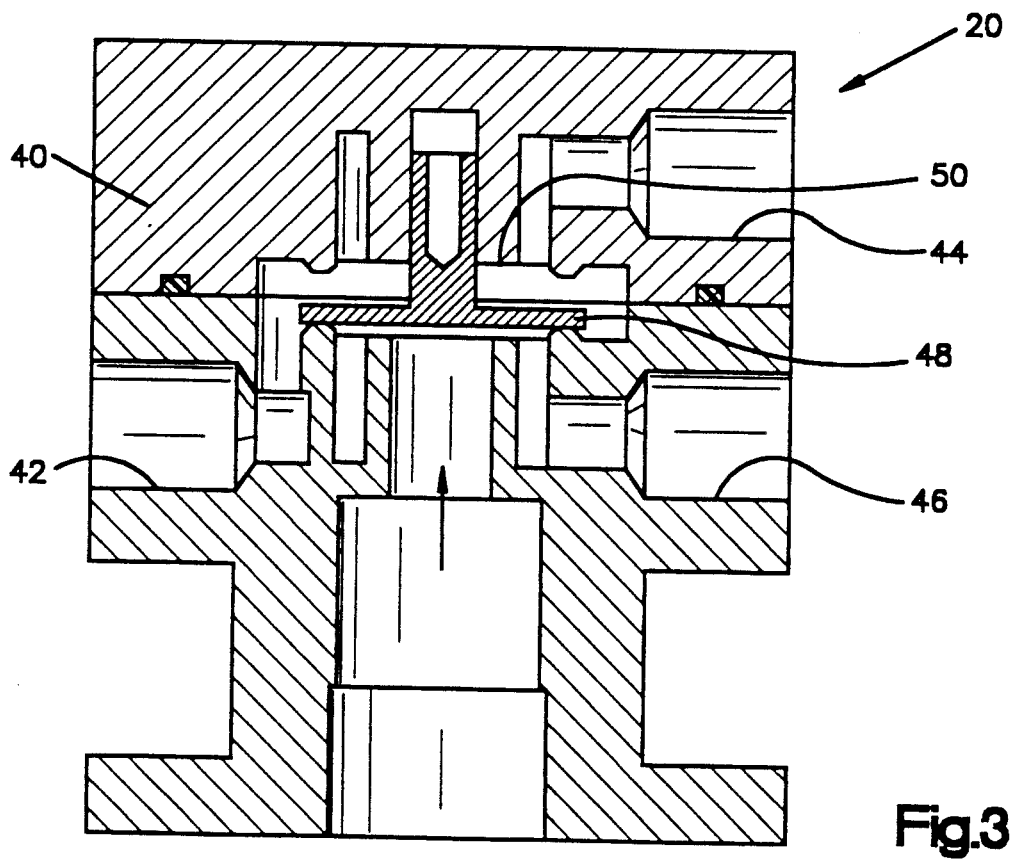
FIG. 3 is a section view of a diverter valve useful in the embodiment of either FIG. 1 or FIG. 2.

An example of a preferred diverter valve 20 is shown in FIG. 3. The valve comprises a body 40 which contains ports 42, 44, and 46. Port 42 is connected with line 12 from pump 16. Port 46 is connected with cooler 30 and port 44 is connected with line 24 to direct electrolyte flow directly into tank 22. The valve 20 is a temperature-activated, proportioning flow diversion valve comprising a diaphragm 48 which is moveable within chamber 50 to direct the flow from port 42 to either of ports 44 or 46. The position of the diaphragm 48 in chamber 50 is temperature-activated by thermostat 28 by means of linkage not shown. The diaphragm 48 can be centered or otherwise positioned in chamber 50 so that the flow can be directed to both ports 44 and 46 in varying proportions depending upon the setting of the thermostat. In the position shown in FIG. 3, the diaphragm 48 is positioned so that there will be no flow through port 46 to cooler 30.

Referring back to FIG. 1, crystallization of the aluminate $KAl(OH)_4$ to the hydrargillite $Al_2O_3 \cdot 3H_2O$ takes place mostly in tank 22. This crystallization can be allowed to take place with or without the addition of seed crystals, alkaline salts, or complexing agents to the tank 22. In the embodiment illustrated in FIG. 1, it was found that the addition of seed crystals, in an amount in the range of about 5-10% by weight, based on weight of electrolyte in the system, was helpful. The seed crystals may be added with electrolyte to the tank 22. The seed crystals may be added initially, when charging the battery, and intermittently during the course of operation, for instance with each addition of electrolyte. A seed which can be used can have a particle size distribution of one to forty (40) microns and an average of ten (10) to fifteen (15) microns such as aluminum hydroxide marketed by Fisher Scientific Corporation. The electrolyte 29 in the tank may contain a relatively high concentration of aluminate.

The hydrargillite which is formed in tank 22 is mostly in the form of very small particles having an average particle size of about 0.5 to about 20 microns and a needle-like configuration. For said hydrargillite, usually a tank residence time of about 0.2 to about five (5) minutes will be suitable. Without seeding, using auto-crystallization or spontaneous crystallization, the average particle size may be only about 0.5-5 microns. With seeding there may be a growth of particles to an average particle size of about twenty (20) microns. Even without agitation of the electrolyte 29 in tank 22, settling of such crystals takes place at a rate of only about 20 millimeters per hour as indicated above, far too slow for viable separation of solids from the electrolyte 29 by means of settling in a small tank of a size appropriate for attachment to the side of cells 18.

In accordance with the present invention, tank 22 is provided with a filter cartridge 60 at electrolyte outlet 62. The filter cartridge comprises a cylindrical vessel 64 (FIG. 4) which is plugged at end 66 with plug 68 and is provided with a threaded nozzle 70 at the opposite end allowing it to be inserted into electrolyte outlet 62. The cylindrical vessel 64 is commercially available and can be constructed of a variety of materials.

One commercially available filter cartridge 60 is a sintered powder metal cartridge having small openings in the cylindrical surface 72. Such sintered powder metal cartridges are marketed under the designation "Porous Sleeves" by Mott Metallurgical Corporation. A sintered powder metal cartridge useful in the practice of the present invention is one preferably having an average size opening less than about three microns, preferably about two microns. Too small of an average opening creates too high an electrolyte pressure drop at the filter. One cartridge found to give good results was a sintered 316 stainless steel powder metal cartridge marketed by Mott Metallurgical Corporation having a manufacturer's rating of two microns. A nickel powder metal cartridge would give good results.

It is also known to manufacture a cartridge of a polymeric material such as Teflon, in which the Teflon is blended with a large number of salts prior to molding which are subsequently leached from the plastic substrate to create openings of about two (2) to three (3) microns in size.

By virtue of the pressure drop across the filter cartridge 60 established by pump 16, electrolyte flows into the interior chamber 74 (FIG. 4) of the vessel 64. The hydrargillite solids impact against the outer surface 72 of the cartridge 60 and agglomerate on the surface 72. The surface 72 is continuously scraped with a helical scraper 76 driven by motor 78. As the surface 72 is scraped, the agglomerated particles, which are approximately 63% by weight hydrargillite, settle by gravity pull onto solids pile 80. The solids can be periodically withdrawn from tank 22 by means of outlet 82, for instance at the time of electrolyte replenishment or anode replenishment.

In accordance with the present invention, it was found that the solid hydrargillite which agglomerated at the filter surface 72 and was removed from the surface had a surface area to weight ratio and configuration that allowed the particles to settle at a significantly higher rate than the non-agglomerated particles, for instance at a rate in the range of about 2,000 to 200,000, and more typically about 100,000 millimeters per hour, an improvement of about $5 \times 10^3$ over the settling rate of the non-agglomerated particles, mentioned above.

The electrolyte with solids removed is circulated from the tank outlet 62 to the cells 18 by means of line 90. The concentration of aluminate in the electrolyte is substantially reduced in the crystallization and filtering process. For instance, with a ten cell, 400 watt stack referred to above, having a circulation rate of about one liter per minute of potassium hydroxide electrolyte, a steady state, in which the amount of aluminum put into solution by the battery is balanced by the amount of aluminate removed from the solution, might be achieved by reducing the aluminate concentration in the electrolyte by about 0.2M (molar). In this example, the aluminate concentration into the crystallizer/filter tank 22 might be about 2.5M (molar) and at outlet 62 about 2.3M (molar).

The electrolyte is circulated through the cells 18, and then from the cells 18 to hydrogen knock-out vessel 92 by means of line 94. The knock-out vessel 92 has an exhaust line 96 for hydrogen removal from the system and also functions as an electrolyte reservoir. Line 98 is a return line for return of electrolyte from knock-out vessel 92 to the inlet 100 for pump 16.

FIG. 2 shows an embodiment of the present invention. In this embodiment, the hydrargillite solids are removed from the surface of the filter cartridges by means of back-wash rather than mechanically as in the embodiment of FIG. 1. In this embodiment, a crystallization/filtration tank 102 receives electrolyte from pump 104. The electrolyte is circulated by pump 104 from cells 106 through a hydrogen knock-out tank 108. The tank 102 in this embodiment is separate from cells 106, but is of a size that, as with the embodiment of FIG. 1, it could be affixed to a side of cells 106. The tank 102 contains two filter cartridges 110 and 112. The filter cartridges 110, 112 are similar to cartridge 60 of the embodiment of FIG. 1. The filter cartridges 110, 112 are connected to an inlet port 114 of cells 106 through a three-way valve 116 and lines 118, 120, and 122.

A second three-way valve 124 is positioned in the lines between the filter cartridge 110, 112 and pump 104. The three-way valve 124 is connected with the pump 104 by means of line 126, and with the filter cartridges 110 and 112 by means of lines 128 and 130 (via lines 118 and 120).

In operation, one of the filter cartridges 110, 112 is in a back-wash mode, while the other is in a filtering mode. For instance, the three-way valve 124 may be set to circulate the electrolyte from pump 104 to the interior of filter cartridge 110 via lines 128 and 118. The flow at this point contains primarily dissolved aluminate so that flow passes readily through the openings of filter cartridge 110 into tank 102. The three-way valve 116 is set so that the flow, induced by pump 104, is from the tank 102 into filter cartridge 112 and from the filter cartridge 112 to cells 106. This places the filter cartridge 112 in a filter mode. A crystallizer 134 is positioned within tank 102. As shown in FIG. 5, the crystallizer 134 is a cylindrical foraminous vessel centered between filter cartridge 110, 112. The dimensions of the crystallizer 134 are such that it does not extend fully across the width of tank 102. Thus, some of the flow from filter cartridge 110 to filter cartridge 112 bypasses the crystallizer 134 and some of the flow passes through the crystallizer 134. The crystallizer 134 contains seed material 136. It also contains an agitator 138 driven by motor 140 (FIG. 2). Agitation of the seed crystals in the crystallizer 134 enhances crystallization and precipitation of hydrargillite in the crystallizer. The over flow ports in the crystallizer 134 are sized to allow the flow of precipitated crystals from the crystallizer into the tank 102. These crystals then impact against the surface of the filter cartridge 112 and are agglomerated on the surface. After a predetermined period of agglomeration, determined by time, or by pressure drop in the system, the positions of three-way valves 116 and 124 are reversed, so that the filter cartridge 112 is shifted to a back-wash mode and filter cartridge 110 is on a filter mode. The flow from pump 104 to the inside of filter cartridge 112 causes the agglomerated particles to flake off of the surface of cartridge 112. The agglomerated particles have a weight to surface area ratio that allows them to settle readily to the bottom of tank 102, from which they are periodically removed. The flow from the filter cartridge 112 is in part through the crystallizer 134, with the impact and agglomeration of crystals now on the outside surface of filter cartridge 110. This is carried out for a predetermined period of time until the process is again reversed back to the original mode stated above, with agglomerated crystals from the surface of filter cartridge 110 settling to the bottom of tank 102, from which they can be removed.

It is apparent that in the sequence of the embodiment of FIG. 2, the flow of electrolyte into and through cells 106 is continuous. As with the embodiment of FIG. 1, an equilibrium in the flow is reached in which the concentration of aluminate in the flow from tank 102 to cells 106 is reduced in an amount equivalent to the increase in aluminum concentration resulting from the flow of electrolyte through cells 106.

In the system of FIG. 2, the use of a separate crystallizer vessel 134 is optional. It is possible to eliminate vessel 134 and use the tank 102 as the crystallizer by dispersing seed material into and throughout the tank. The residence time for electrolyte in the tank would be sufficient for crystallization of hydrargillite to take place in the tank. Solids on the cartridge also function as seed. In this embodiment, alternate filtering and back-washing of cartridges 110 and 112 is carried out similar to the embodiment above described, so that a steady state is achieved whereby aluminate is removed from the electrolyte in tank 102 at the same rate as aluminum is added to the electrolyte from cells 106.

If desired, the electrolyte in tank 102 of the embodiment of FIG. 2 can be cooled similar to the procedure of the embodiment of FIG. 1. This can be accomplished by positioning a diverter valve (similar to valve 20 of FIG. 1) in line 126 with one port being connected to a cooler similar to cooler 30 of the embodiment of FIG. 1. Flow from the cooler can be fed to tank 102 cooling the electrolyte in the tank. The diverter valve can be temperature actuated as in the embodiment of FIG. 1.

Above, with regard to the embodiment of FIG. 1, it was mentioned that the addition of seed crystals into tank 22, in the amount in the range of about 5–10%, may be helpful. As indicated, however, it may be possible, in the embodiment of FIG. 1, to rely upon auto crystallization for the formation of filterable precipitate.

The addition of seed crystals to tank 102, in the embodiment of FIG. 2, with or without a crystallizer 134, however, is more important, since, in the embodiment of FIG. 2, the crystallization should take place only in the tank 102. Should auto-crystallization occur in the system elsewhere than in tank 102, it could cause the filter openings, of the cartridge filter which is on back-wash, to become plugged.

The invention is further illustrated in the following Example. While this Example will show one skilled in the art how to operate within the scope of the present invention, it does not serve as a limitation on the scope of the invention where such scope is defined in the claims of this application.

EXAMPLE

In this Example, the electrolyte was a five molar solution of potassium hydroxide. The electrolyte contained solid aluminum hydroxide ($Al_2O_3 \cdot 3H_2O$) in an average amount of about 0.085 percent by weight. The aluminum hydroxide had an average particle size of about twelve microns. The electrolyte was circulated at a rate of about one liter per minute through the pores of a two inch diameter, ten inch long, 316 stainless steel filter cartridge (marketed by Mott Metallurgical Corporation) having a rating of two microns. The aluminum hydroxide particles were impacted onto the outer surface of the filter cartridge and were allowed to agglomerate on the surface.

The flow was maintained for an elapsed time of about fifteen minutes, with the flow rate decreasing proportionate to the solids build-up on the filter. After agglomeration, the flow onto the surface of the cartridge was stopped, a slight back-flush was allowed, and the agglomerated particles were allowed to flake off of the cartridge. The agglomerated particles settled readily in the electrolyte to the bottom of a vessel surrounding the filter cartridge. During the period of flow through the filter cartridge, no visible solids were observed at the cartridge outlet. Settling in the vessel surrounding the filter cartridge was deemed to take place at a rate of about $5\times10^3$ over the rate of settling of non-agglomerated particles.

Having described a preferred embodiment of the invention, we claim:

1. A closed-loop filter system for continuously removing a metal hydroxide precipitate from an alkali-metal hydroxide solution comprising:
   a filter tank including an inlet and an outlet;
   a filter at said outlet having a filter surface and a plurality of small diameter openings in said surface, said filter surface being disposed within said filter tank,
   means for introducing said alkali metal hydroxide solution into said tank at said tank inlet and for impacting said alkali metal hydroxide solution containing metal hydroxide precipitate onto said filter surface, metal hydroxide precipitate agglomerating on said surface, said filter surface openings having an average diameter effective for said agglomerating;
   means for continuously said agglomerated precipitate from said filter surface, and;
   means for separating said agglomerated precipitate from said alkali metal hydroxide solution, the agglomerated precipitate having a particle weight to surface area ratio effective for said separation, wherein said separation is by settling of said precipitate in said tank and wherein said filter system is constructed and arranged to allow particles of said agglomerated precipitate to settle in said solution at a rate in the range of about 2,000 to about 200,000 millimeters per hour.

2. The system of claim 1 wherein said filter is a sintered powder metal cartridge.

3. The system of claim 2 wherein said metal hydroxide is aluminum hydroxide and said alkali metal hydroxide solution is a potassium hydroxide solution, and said filter has an average size opening less than about three microns.

4. The system of claim 3 wherein said means to remove said agglomerated precipitate from said filter is mechanical.

5. The system of claim 3 wherein said means to remove said agglomerated precipitate from said filter surface is back-wash through the filter.

6. The system of either claim 4 or claim 5 wherein said filter cartridge has a two micron rating.

7. The system of claim 4 including temperature control means for maintaining said electrolyte at a temperature in the range of about 50°–80° F.

8. A battery assembly comprising:
   (1) an aluminum air cell;
   (2) a closed-recirculation loop for continuously recirculating potassium hydroxide electrolyte through said cell;
   (3) a filter system in said loop for continuously removing aluminum hydroxide precipitate from said electrolyte, said precipitate comprising particles having an average particle size of about 0.5–20 microns, said filter system comprising;
   (i) a closed tank;
   (ii) means for introducing electrolyte from said aluminum-air cell into said tank, said tank having a residence time effective for crystallization of aluminum hydroxide precipitate to take place in said tank;
   (iii) means for recirculating electrolyte from said tank back to said cell;
   (iv) filter means in said tank for agglomerating the particles of aluminum hydroxide precipitate from electrolyte recirculated to said cell;
   (v) means for removing said agglomerated precipitate from the surface of said filter means and for allowing said agglomerated particles to settle in said tank.

9. The assembly of claim 8 including means for adding seed crystals to said tank.

10. The assembly of claim 8 wherein said tank is affixed to a side of said aluminum-air cell.

11. The assembly of claim 8 wherein said means for removing said agglomerated precipitate from said filter means is mechanical.

12. The assembly of claim 8 wherein said means for removing said agglomerated precipitate from said filter means is by back-wash through said filter means.

13. The assembly of claim 8 wherein said filter means is a filter cartridge having an average size opening less than about three microns.

14. A battery assembly comprising:
   (a) a metal-air cell;
   (b) a closed recirculation loop for continuously recirculating an alkali metal hydroxide electrolyte through said cell;
   (c) a filter system in said loop for continuously removing a metal hydroxide precipitate from said alkali metal hydroxide electrolyte, said filter system comprising;
   (i) a filter tank;
   (ii) a flow line for introducing said alkali metal electrolyte and metal hydroxide precipitate into said tank;
   (iii) means in said tank for separating said precipitate from said electrolyte; and
   (iv) temperature control means for maintaining a relatively constant temperature of said solution in said tank; said temperature control means comprising:
   (a) a heat exchanger;
   (b) a diverter valve having multiple ports in said flow line; and
   (c) means connecting said heat exchanger to one port of said diverter valve and to said tank whereby a portion of the flow in said flow line is divertible to said heat exchanger.

15. The assembly of claim 14 wherein said heat exchanger is a cooler.

16. The assembly of claim 15 wherein said metal-air cell is an aluminum-air cell.

17. The assembly of claim 15 further comprising a thermostat positioned in said tank, said diverter valve being responsive to said thermostat.

18. The assembly of claim 14 wherein said diverter valve is a temperature-actuated proportioning flow diversion valve.

19. The assembly of claim 14 including cooler means and means for circulating at least a portion of said alkali metal hydroxide solution through said cooler means to maintain said solution in said tank at a temperature in the range of about 50°–80° F.

20. A method for filtering a metal hydroxide precipitate from an alkali metal hydroxide solution comprising the steps of:
   (a) providing a filter tank including an inlet and an outlet;
   (b) providing a filter at said outlet having a filter surface and a plurality of small diameter openings in said filter surface, said filter surface being disposed within said filter tank;

(c) introducing said alkali metal hydroxide solution into said tank at said tank inlet and impacting said alkali metal hydroxide solution containing metal hydroxide precipitate onto said filter surface, metal hydroxide precipitate agglomerating on said surface, said filter surface openings having an average diameter effective for said agglomerating;

(d) continuously removing said agglomerated precipitate from said filter surface, and;

(e) separating said agglomerated precipitate from said alkali metal hydroxide solution, the agglomerated precipitate having a particle weight to surface area ratio effective for said separation, said separation being by settling of said precipitate in said tank, wherein said agglomerated precipitate has a weight to surface are ratio providing particle settling in said solution with the range of about 2,000 to about 200,000 millimeters per hour.

21. The method of claim 20 wherein said filter is a sintered powder metal cartridge.

22. The method of claim 21 wherein said metal hydroxide is aluminum hydroxide and said alkali metal hydroxide solution is a potassium hydroxide solution, said filter having an average size opening less than about three microns.

23. The method of claim 22 wherein said potassium hydroxide solution is an aluminum-air cell electrolyte.

24. The method of claim 20 wherein said agglomerated precipitate is removed from said filter surface mechanically.

25. The method of claim 24 wherein said filter cartridge has a two micron rating.

26. The method of claim 20 wherein said agglomerated precipitate is removed from said filter surface by a backwash through said filter.

27. The method of claim 20 wherein said tank has a residence time within the range of about 0.2 to about 5 minutes.

28. The method of claim 20 including the step of adding seed crystals to said tank in an amount within the range of about 5%–10% by weight based on the weight of said alkali metal hydroxide solution.

29. The method of claim 20 including the step of cooling said alkali metal hydroxide solution in said tank to a temperature in the range of about 50°–80° F.

30. A battery assembly comprising:
(1) an aluminum air cell;
(2) a closed-recirculation loop for continuously recirculating potassium hydroxide electrolyte through said cell;
(3) a filter system in said loop for continuously removing aluminum hydroxide precipitate from said electrolyte, said precipitate comprising particles having an average particle size of about 0.5–20 microns, said filter system comprising;
(i) a closed tank;
(ii) means for recirculating electrolyte from said tank back to said cell;
(iii) filter means in said tank for agglomerating the particles of aluminum hydroxide precipitate from electrolyte recirculated to said cell;
(iv) means for removing said agglomerated precipitate from the surface of said filter means and for allowing said agglomerated particles to settle in said tank.

* * * * *

UNITED STATES PATENT AND TRADEMARK OFFICE
CERTIFICATE OF CORRECTION

PATENT NO. : 4,994,332

DATED : February 19, 1991

INVENTOR(S) : Coin et al

It is certified that error appears in the above-identified patent and that said Letters Patent is hereby corrected as shown below:

In Claim 1, column 9, line 21, after "continuously"

insert --removing--.

Signed and Sealed this

Seventh Day of July, 1992

Attest:

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO.  : 4,994,332
DATED       : February 19, 1991
INVENTOR(S) : Coin et al It is certified that error appears in the above-identified patent and that said Letters Patent is hereby corrected as shown below:

Column 1, line 4, please insert the following:

--This invention was made with Government support under
Contract No. N66001-89-C-7012 awarded by the Naval
Ocean Systems Center. The Government has certain rights
this invention--.

Signed and Sealed this

Sixth Day of October, 1992

Attest:

DOUGLAS B. COMER

Attesting Officer

Acting Commissioner of Patents and Trademarks